(12) United States Patent
Cellier et al.

(10) Patent No.: US 10,002,209 B2
(45) Date of Patent: *Jun. 19, 2018

(54) METHOD FOR MODELLING A PART, IN PARTICULAR A BLADING

(71) Applicant: SNECMA, Paris (FR)

(72) Inventors: Damien Joseph Cellier, Moissy-Cramayel (FR); Vincent Paul Gabriel Perrot, Moissy-Cramayel (FR)

(73) Assignee: SNECMA, Paris (FR)

( * ) Notice: Subject to any disclaimer, the term of this patent is extended or adjusted under 35 U.S.C. 154(b) by 273 days.

This patent is subject to a terminal disclaimer.

(21) Appl. No.: 14/784,920

(22) PCT Filed: Apr. 16, 2014

(86) PCT No.: PCT/FR2014/050934
§ 371 (c)(1),
(2) Date: Oct. 15, 2015

(87) PCT Pub. No.: WO2014/170612
PCT Pub. Date: Oct. 23, 2014

(65) Prior Publication Data
US 2016/0063139 A1    Mar. 3, 2016

(30) Foreign Application Priority Data

Apr. 16, 2013 (FR) ..................... 13 53439

(51) Int. Cl.
*G06F 17/50* (2006.01)
*F01D 9/04* (2006.01)
*F01D 5/14* (2006.01)

(52) U.S. Cl.
CPC .............. *G06F 17/50* (2013.01); *F01D 5/14* (2013.01); *F01D 5/141* (2013.01); *F01D 9/041* (2013.01);
(Continued)

(58) Field of Classification Search
CPC ...... G06F 17/50; G06F 17/5009; F01D 5/141; F01D 9/041; F01D 5/14; F05D 2220/30; F05D 2260/81; Y02T 50/673
(Continued)

(56) References Cited

U.S. PATENT DOCUMENTS

| 2003/0086788 A1* | 5/2003 | Chandraker | ............ F01D 5/141 416/235 |
| 2009/0104023 A1* | 4/2009 | Favray | .................... F01D 5/141 415/160 |

(Continued)

FOREIGN PATENT DOCUMENTS

WO    WO-2007011355    1/2007

OTHER PUBLICATIONS

Karpowitz "Bézier Curve Fitting Method for Existing Turbine Blade Design". Journal of Applied Engineering Mathematics Apr. 2005, vol. 1, p. 1-4.*

(Continued)

*Primary Examiner* — Eunhee Kim
(74) *Attorney, Agent, or Firm* — Womble Bond Dickinson (US) LLP

(57) ABSTRACT

The present invention relates to a method for modelling a part (1), the method being characterized in that it comprises implementing, using data processing means (11) of a piece of equipment (10), steps of: (a) parameterizing a curve of class C1 representing the value of a physical quantity characterizing said part (1) as a function of a position along at least one portion of the part (1), the curve being defined by: a. two end points ($PCU_0$, $PCU_K$) defining the extent of said portion of the part (1); b. at least one intermediate point $PCU_i$, $i \in [[1, K-1]]$) located between the two end points ($PCU_0$, $PCU_K$); c. at least two Bezier curves connected to said intermediate point; the parameterization being carried out using one or more parameters defining said intermediate point; (b) determining optimized values for said parameters
(Continued)

of said curve; and (c) returning the determined values to an interface (13) of said piece of equipment (10).

13 Claims, 10 Drawing Sheets

(52) U.S. Cl.
CPC ...... *G06F 17/5009* (2013.01); *F05D 2220/30* (2013.01); *F05D 2260/81* (2013.01); *Y02T 50/673* (2013.01)

(58) Field of Classification Search
USPC .......................................... 703/1; 700/97–98
See application file for complete search history.

(56) References Cited

U.S. PATENT DOCUMENTS

2009/0319224 A1* 12/2009 Jackson ................. G01B 21/20
702/167

2011/0301915 A1* 12/2011 Lobato ................... G01B 21/04
702/167

OTHER PUBLICATIONS

International Search Report with English Language Translation, dated Jun. 10, 2014, Application No. PCT/FR2014/050934.
French Search Report and Written Opinion, dated Jan. 31, 2014, French Application No. 1353439.
Bonaiuti, Duccio, et al., "Analysis and Optimization of Transonic Centrifugal Compressor Impellers Using the Design of Experiments Technique", *Journal of Turbomachinery*, vol. 128, No. 4, (Jan. 1, 2006), 786-797.
Giannakoglou, K.C., "A Design Method for Turbine Blades Using Genetic Algorithms on Parallel Computers", *Computational Fluid Dynamics*, Retrieved from the Internet: http://velos0.ltt.mech.ntua.gr/research/pdfs/3_041.pdf, (Jan. 1, 1998), 1-6.

* cited by examiner

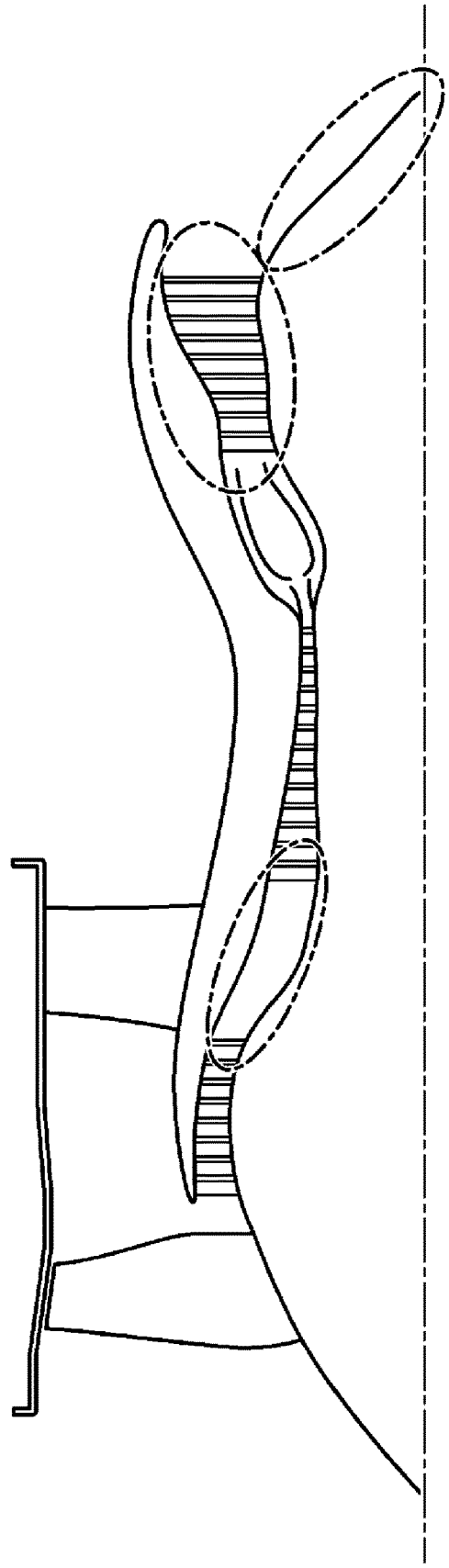

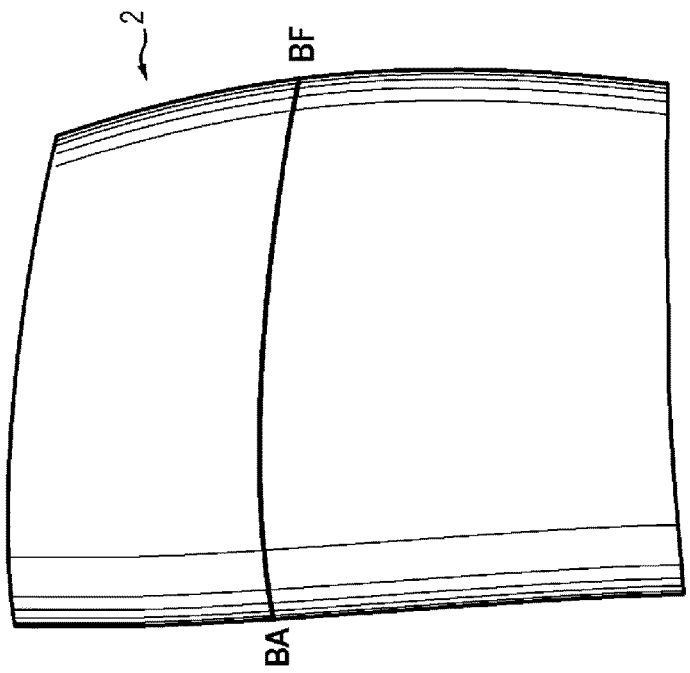
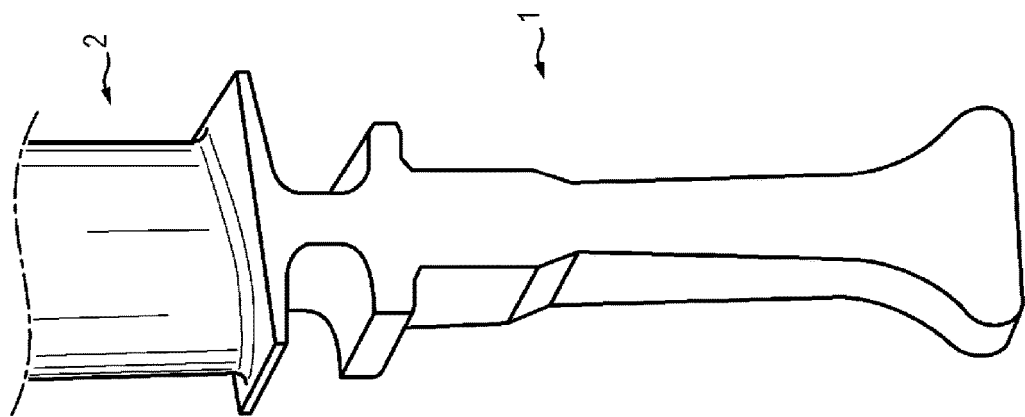

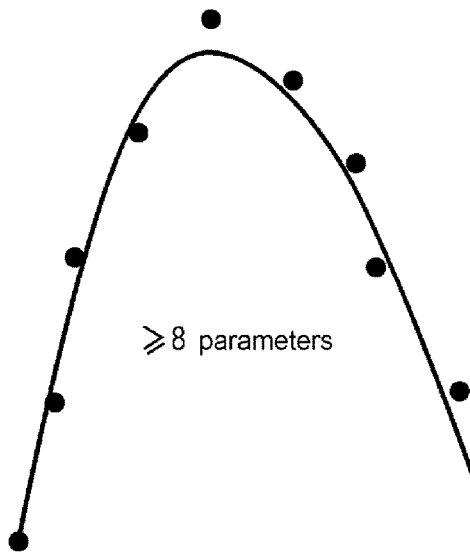
Prior art
FIG. 2a
≥ 8 parameters
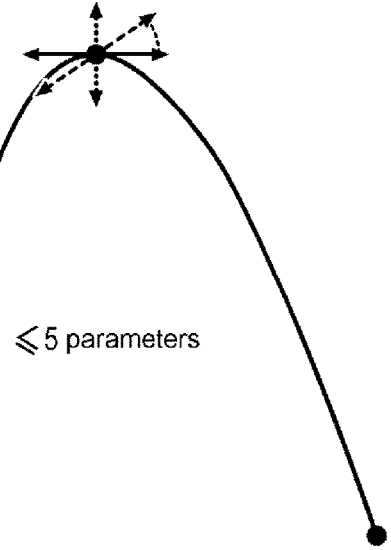
FIG. 2b
≤ 5 parameters
FIG. 3
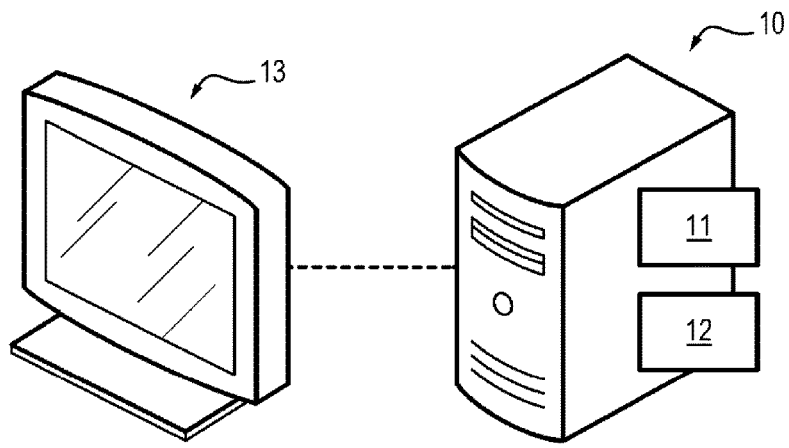

Standardized chord length

Standardized chord length

METHOD FOR MODELLING A PART, IN PARTICULAR A BLADING

GENERAL TECHNICAL FIELD

The present invention relates to computer aided design.
More specifically, it relates a method for modeling a part, in particular a blading.

STATE OF THE ART

The requirement of constantly improving the performances of pieces of equipment, in particular of aeronautical equipment, for example rotors of turbine engines (i.e., the assembly formed with a hub on which are attached blades extending radially, as visible in FIG. 1a), has today imposed the use of computer modeling tools.

These tools give the possibility of assisting with the design of parts by automatically optimizing some of their characteristics. For a blading (i.e., the assembly formed with the blades of a turbine engine disc, one fragment of which is illustrated in FIG. 1b), the principle is to determine an aeromechanical and/or acoustic geometrical optimum of laws of a blade of the blading, in other words of one or several curves describing the value of a physical quantity (examples will be given later on) along a section or a height of the blade, in a given environment, by executing a large number of simulation computations.

For this, it is necessary to parameterize the law for which optimization is sought, i.e., to make it a function of N input parameters. The optimization then consists of varying (generally randomly) these different parameters under a constraint, until their optimum values are determined for a predetermined criterion. A "smoothed" curve is then obtained by interpolation from determined passage points.

The number of computations required is then directly related (linearly or even exponentially) to the number of input parameters of the problem.

Many methods for parametrization of a law exist and it is in particular possible to distinguish two large categories:

A discrete model: The law is defined by the position of a plurality of points (in practice 5 to 10 for a law over the height, and 50 to 200 for a section), displaced one by one during optimization;

A parametric model: The law is defined via mathematical curves known in the literature, such as Bézier curves or NURBS curves (non-uniform rational B-splines).

It is desirable to use a large number of parameters for improving by as much the quality of a law (this is a major challenge for the designs of blades), but such an approach is rapidly limited by the capacity and the resources of present processors.

Even by using expensive supercomputers, the time required for modeling a single law is consequent.

Another problem, it is seen that in the presence of a large number of parameters problems occur: The determined laws actually have a too large number of passage points to be observed, and the first curves obtained are abnormally "rippled" (this is what is called the Runge phenomenon) and cannot be utilized as such. They have to be reworked until they are sufficiently smooth, which further increases the time required for obtaining results.

For all these reasons, the parametric representations (using mathematical curves) are quasi exclusively used since it is noticed that they require up to five times less parameters for modeling a law with equal quality.

However, it is seen that even with high level parametric representations, the number of required parameters for having a sufficient modeling quality for the present standards remains a problem (about 10 parameters).

It would be desirable to find a way of parameterizing and optimizing the laws of a blade (or of any other part) which is still more economical in terms of use of computer resources, which gives the possibility of maintaining or even increasing the modeling quality, and this while limiting the risks of occurrence of "rippled" curves.

PRESENTATION OF THE INVENTION

The present invention proposes according to a first aspect, a method for modeling a part, the method being characterized in that it comprises performing, by data processing means of a piece of equipment, steps of:

(a) parameterizing a curve of class $C^1$ representing the value of a physical quantity characterizing said part as a function of a position along at least one portion of the part, the curve being defined by:
  a. two end points defining the extent of said portion of the part;
  b. at least one intermediate point positioned between the end points;
  c. at least two Bézier curves connected at said intermediate point;
  the parameterization being applied according to one or several parameters defining said intermediate point;

(b) determining optimized values of said parameters of said curve;

(c) outputting the determined values on an interface of said piece of equipment.

Bézier curves are parametric polynomial curves defined as combinations of N+1 elementary polynomials, so-called Bernstein Polynomials: a Bézier curve is defined by the set of points $\Sigma_{i=0}^{N} B_i^N(t) \cdot P_i$, $t \in [0,1]$, the $B_i^N(t) = \binom{N}{i} t^i (1-t)^{N-i}$ being the N+1 Bernstein polynomials of degree N.

The points $\{P_0, P_1 \ldots P_N\}$ are called "implicit" control points of the curve and are the variables by which a law of a blade may be modeled by a Bézier curve.

These points are called "implicit" since a Bézier curve may be seen as the whole of the barycenters of the N+1 control points weighted with a weight equal to the value of the Bernstein polynomial associated with each control point. In other words, these points act like localized weights attracting the curve generally without it passing therethrough (except for the first and the last points, respectively corresponding to t=0 and t=1, and certain cases of alignment of points).

Generally, in the known modeling techniques of a law using a Bézier curve, the end control points $P_0$ and $P_N$ of the curve used are fixed (they define the extent of the portion of a part, in particular a blade of blading, on which modeling will be applied), but the other points $\{P_1 \ldots P_{N-1}\}$ have mobile coordinates forming the input parameters for the optimization algorithm.

The present modeling method proposes parameterization of a law not via implicit control points of a complex Bézier curve, but only via connecting points (so called "intermediate user control points (UCP)") of a plurality of elementary Bézier curves.

Further, unlike the prior art which only proposed a definition of the control points by their coordinates (x, y), the present method advantageously proposes also the use of criteria for example related to the tangents as additional input parameters.

In other words, instead of modeling a law via the sole positions of a large number of implicit control points, up to five parameters of a small number of explicit control points are used.

FIGS. 2a and 2b illustrate this principle by comparing the control points required in a known method and in the method according to the invention. The applicant thus noticed that this novel technique gives the possibility, with twice as less parameters (or even in certain cases 60% less), of obtaining an equivalent modeling quality. The time and/or the computing power required are therefore substantially reduced.

Moreover, independently of the number of parameters, the number of control points is as for it reduced by a factor three or even four (since the intermediate control points concentrate a larger number of parameters). The problem of the undesirable "ripple" effect resulting from a too large number of passage points of the curve is thus considerably resolved.

According to other advantageous and nonlimiting features:

- The parameter(s) defining an intermediate point are selected from an abscissa of the point, an ordinate of the point, an orientation of a tangent to the curve at the point and two tension coefficients each associated with a half-tangent to the curve at the point;
- the parameterization is also applied according to one or several parameters defining at least one of the end points;
- the parameter(s) defining an end point is(are) selected from an abscissa of the point, an ordinate of the point, an orientation of the tangent to the curve at the point and a tension coefficient associated with a half-tangent to the curve at the point;
- a tension coefficient associated with a half-tangent to the curve at an intermediate or end point depends on a value of a second derivative of the curve in the vicinity of the point;
- said curve is defined by K−1 intermediate points ordered according to the travel of said part portion, and by K Bézier curves, with K≥2;
- the first Bézier curve is defined on the interval comprised between the end point associated with the beginning of said part portion and the first intermediate point, the $K^{th}$ Bézier curve is defined on the interval comprised between the K−$1^{th}$ intermediate point and the end point associated with the end of said part portion;
- K≥3, the single Bézier curve or the $i^{th}$ Bézier curves each being defined on an interval comprised between the i−$1^{th}$ intermediate point and the $i^{th}$ intermediate point;
- each Bézier curve is entirely determined by the points defining its extremities;
- the part is selected from among blading, a turbine engine platform, a rearview mirror, a fin, a fixed or rotary wing, a tail, a fuselage, a propeller, a nozzle, a vein, a fairing, and a turbine;
- the part is a blade, the part portion being a portion of a blade of the blading;
- said portion of a blading's blade is a sectional portion of the blade of the blading or a height portion of the blade of the blading;
- said physical quantity characterizing said blading is selected from the thickness of the blading, the skeleton, the skeleton angle law of a section of a blade of the blading, the maximum thickness law, the maximum thickness position law, the sag and dihedral angles, the stacking law, the upstream/downstream angles of the blade of the blading along the height.

According to a second aspect, the invention relates to a method for manufacturing a part, the method comprising the steps:

- applying the method according to the first aspect so as to at least model one portion of the part;
- manufacturing said part according to the modeling of at least one portion of the obtained part.

According to a third aspect, the invention relates to a piece of equipment for modeling a part characterized in that it comprises data processing means configured in order to implement:

- a module for parameterization of a curve of class $C^1$ representing the value of a physical quantity characterizing said part as a function of a position at least along one portion of the part, the module defining a curve by:
  - two end points defining the extent of said portion of the part;
  - at least one intermediate point positioned between the end points;
  - at least two Bézier curves connected at said intermediate point;
  - the parameterization being applied according to one or several parameters defining said intermediate point;
- a module for determining optimized values of said parameters of said curve;
- a module for outputting the determined values on an interface of said piece of equipment.

According to a fourth and a fifth aspect, the invention respectively relates to a computer program product comprising code instructions for executing a method according to the first aspect of the invention for modeling a part; and a storage means which is legible by a computer equipment on which a computer program product comprises code instructions for executing a method according to the first aspect of the invention for modeling a part.

PRESENTATION OF THE FIGURES

Other features and advantages of the present invention will become apparent upon reading the description which follows of a preferential embodiment. This description will be given with reference to the appended drawings wherein:

FIG. 1a described earlier represents an exemplary turbine engine;

FIG. 1b described earlier illustrates an exemplary blade for which the method according to the invention is applied;

FIGS. 1c-1d illustrate a section of a blade of a blading;

FIGS. 2a-2b described earlier compare the parameterization of a curve in a method of the prior art and in a method according to the invention;

FIG. 3 illustrates a system for applying the method according to the invention;

DETAILED DESCRIPTION

Generally, it will be understood that the present method is preferably intended for modeling a turbine engine part, in particular a blading (any blading), but it is not limited either to this part nor even to the field of aeronautics. Any "part", i.e., any industrially manufactured element and for which the design complies with external physical constraints (in particular of the aeromechanical and/or acoustic type, but also of hydrodynamic type, etc.), may be modeled and optimized by means of this method.

In the following of the present description, the example of a blade of blading will be taken, but one skilled in the art will know how to transpose the method for modeling for example:

- in the field of turbine engines, the veins (inner and outer walls of each of the flows), 3D platforms (non-axisymmetrical design of the platform of a single block bladed disc or of the ferrule of a rectifier). With reference to FIG. 1a, by moving from the inlet of the turbine engine to the outlet, exemplary areas of the turbine engine were successively shown, for which modeling with the present method is particularly advantageous: a vein portion said to be with "a swan neck" (i.e., the vein portion positioned between the outlet of the low pressure compressor and the inlet of the high pressure compressor), the turbine (at the outlet of the combustion chamber), and the nozzle (at the outlet of the turbine);
- in the automotive field (in particular Formula One), the rearview mirrors, the fins;
- in the field of aeronautics, the airfoil of an airplane, the tails, the fuselage, the blades of a helicopter, the empennage of the tail of a helicopter, the propellers of an airplane;
- in the space sector, the ejection nozzle of a rocket engine (and more widely a design of any type of nozzles);
- in the railway sector, the front and the rear of a train;
- in the field of hydrodynamics, the propellers used in water treatment tanks, the propellers of a fan, the propellers of a ship, the blades of a turbine of a dam;
- and many other parts in various fields such as the shape of handlebars of a bicycle or motorcycle.

Generally, it will be understood that the present method is particularly suitable for modeling any part intended to be mobile with respect to a contacting fluid, and the shape of which has an influence on the performances, in particular vehicle parts (in the broad sense: land, sea, air, space, vehicles etc.), and rotary industrial parts (propellers, turbines, etc.). In the field of turbine engines, the part 1 is preferentially selected from a blading, a platform, a vein and a nozzle (of the turbine engine).

In FIG. 1b, the blading 1 has a plurality of blades 2 (the base of one of them is seen) extending radially from a central disc portion. FIG. 1c illustrates a detail of a blade 2 on which a "section" of the blade 2 was identified, which extends from a leading edge BA towards a trailing edge BF. By section, is meant a cross-section of the blade 2.

Figure 1D:
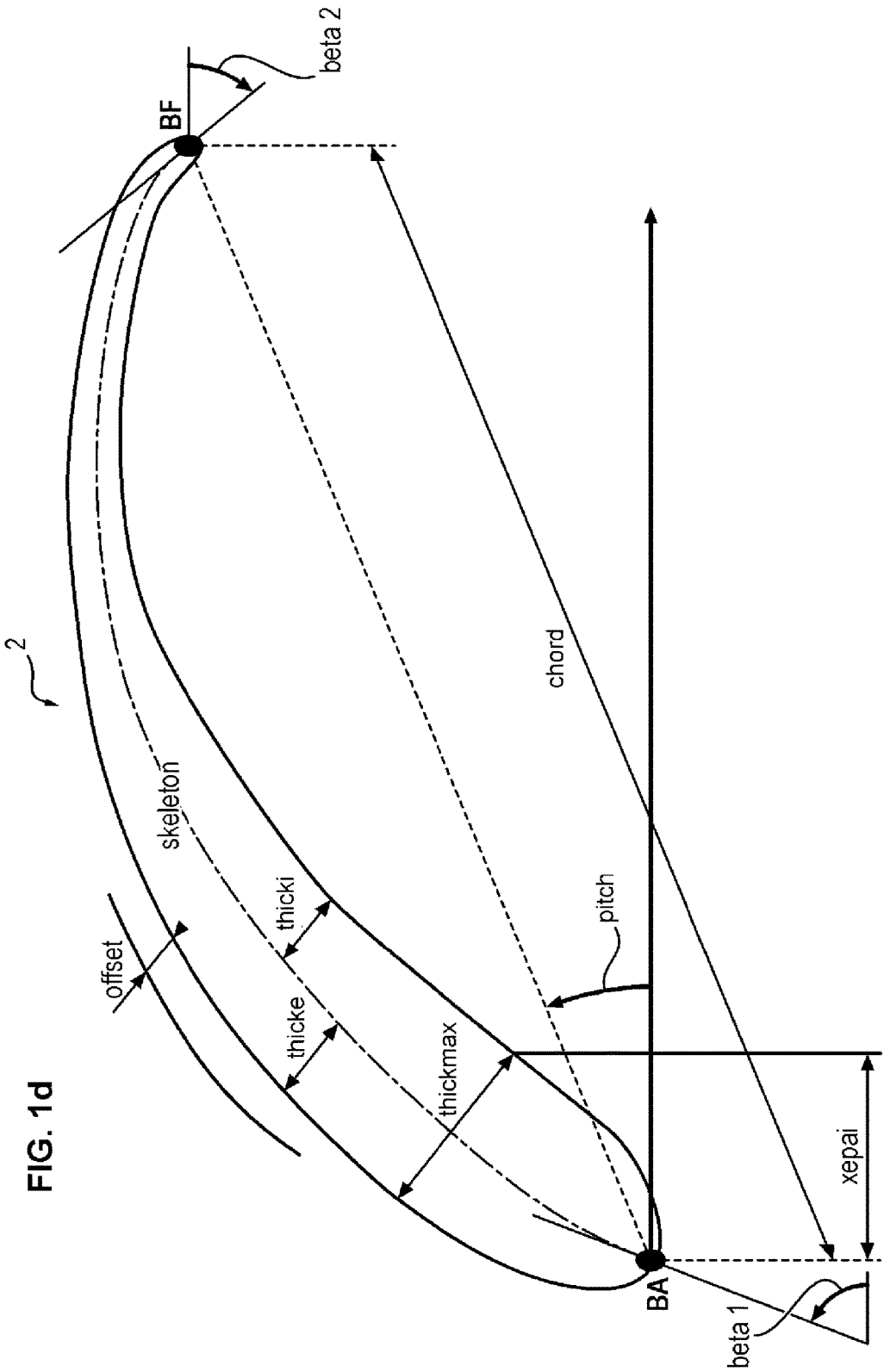

FIG. 1c1 more specifically illustrates this BA-BF section (the concave-convex profile is noted). The "chord" should be noted, i.e., the straight line which connects the extremities of the section. This chord will be used as this will be seen later as a mark for locating the points along the section. In FIG. 1d a middle line, the "skeleton" of the blade 2 is also seen. Orthogonally to a section, the "height" of the blade 2 is found. Several physical quantities of the blade are also illustrated and will be described later on. As explained, these quantities may be modeled along a section or a height of the blade 2.

Such blading is modeled, during its design, via a piece of computer equipment 10 of the type of the one illustrated in FIG. 3. It comprises data processing means 11 (one or several processors), data storage means 12 (for example one or several hard disks), interface means 13 (consisting of input means such as a keyboard and a mouse or a tactile interface, output means such as a screen for displaying results). Advantageously, the piece of equipment 10 is a supercomputer, but it will be understood that an application on various platforms is quite possible.

Many criteria may be selected as criteria to be optimized during the modeling of a blade or of another part. As an example, in the case of a blade, maximization of the mechanical properties such as the resistance to mechanical stresses, frequency responses of the blade, displacements of the blade, aerodynamic properties such as the yield, the pressure rise, the throughput capacity or the pumping margin, etc. may be attempted.

Parameterization

A step (a), applied by the data processing means 11 under control of an operator, is a first step for parameterizing a curve representing the value of a physical quantity characterizing said blading 1 (or of any other part) as a function of a position along at least one portion of a blade 2 of the blading 1 (generally a portion of the part), in particular a portion of a section or a height of the blade 2. By "sectional portion", is meant all or part of the space extending from the leading edge BA to the trailing edge BF. By "height portion", is meant all or part of the space extending from the proximal extremity to the distal extremity of the blade 2.

In the continuation of the present description, the example of the section of a blade 2 will be taken, but it will be understood that the method is transposable to any defined subspace of the part.

As explained earlier, the position along the curve is expressed according to the chord length (in abscissas), and more specifically the "standardized" chord length, i.e., expressed between 0 and 1 when one crosses the blade 2, to be covered in order to attain the (orthogonal) projection of this point on the chord. This in other words corresponds to the x coordinates which a point of the section would have in an orthonormal reference system in which the point BA would have (0,0) as coordinates, and the BF point (0,1). For example, a point of the section associated with a normalized chord length of "0.5" is on the perpendicular bisector of the chord. It is noted that as the curve may extend only on one (continuous) portion of the section of the blade 2, the associated function is defined on a subinterval of [0, 1].

However, it will be understood that the invention is by no means limited to the expression of a curve representing the value of a quantity versus a chord length, and that other marks are possible.

This curve representing the value of a physical quantity should be understood as the modeling of a law of this physical quantity (as such it will be designated as "modeling curve" in order to distinguish it from the Bézier curves in terms of terminology). Said physical quantity may be any quantity having an aeromechanical and/or acoustic meaning for the design of parts, and mention will be made as non limiting examples in the case of blading, of:

a function of the chord (sectional vision)
  Thickness law
  Skeleton angle law
A function of the blade height (3D vision)
  Max thickness, position of the max thickness
  Sag and dihedral laws (BA, BF, . . . )
  Stacking law of the sections
  Upstream/downstream angle laws ($\beta 1$, $\beta 2$)
Associated examples will be described later on.

In the case when the part 1 is a nozzle, the physical quantity may be the section of the nozzle, which allows definition of the minimum section of the nozzle, controlling the change in the effective Mach number in the nozzle, etc. In the case of a vein, the physical quantity may be the section of the vein, the section ratio (inlet section/outlet section), the slowing down (which is the ratio between the outlet speed and the inlet speed. This parameter inter alia gives the possibility of estimating the ease with which the fluid will be able to follow the required angle variations).

The modeling curve is a regularity class of at least $C^1$, i.e., it corresponds to a continuous function and of at least one continuous first derivative on its definition space (the portion of the part). The significance of this condition will be seen further on. In practice, the obtained curve is $C^\infty$ piecewise (functions which may be indefinitely derived on each interval), with continuity of the curve and of the derivative at the connections (the intermediate control points). It will be understood that these are minimum conditions and that the curve may quite be for example $C^\infty$ over the whole of its definition space.

The curve is defined by means of its control points. Like in the prior art, two end user control points $UCP_0$ and $UCP_K$ are fixed and define the extent of the portion of the part (i.e. the definition domain of the curve). The modeling curve further comprises at least one intermediate user control point $UCP_i$, $i \in [[1, K-1]]$ positioned between both of these two end points $UCP_0$ and $UCP_K$.

The intermediate point(s) are "explicit" control points since the curve passes through them. Indeed, the latter comprises at least two Bézier curves connected at said intermediate point.

Figure 4:
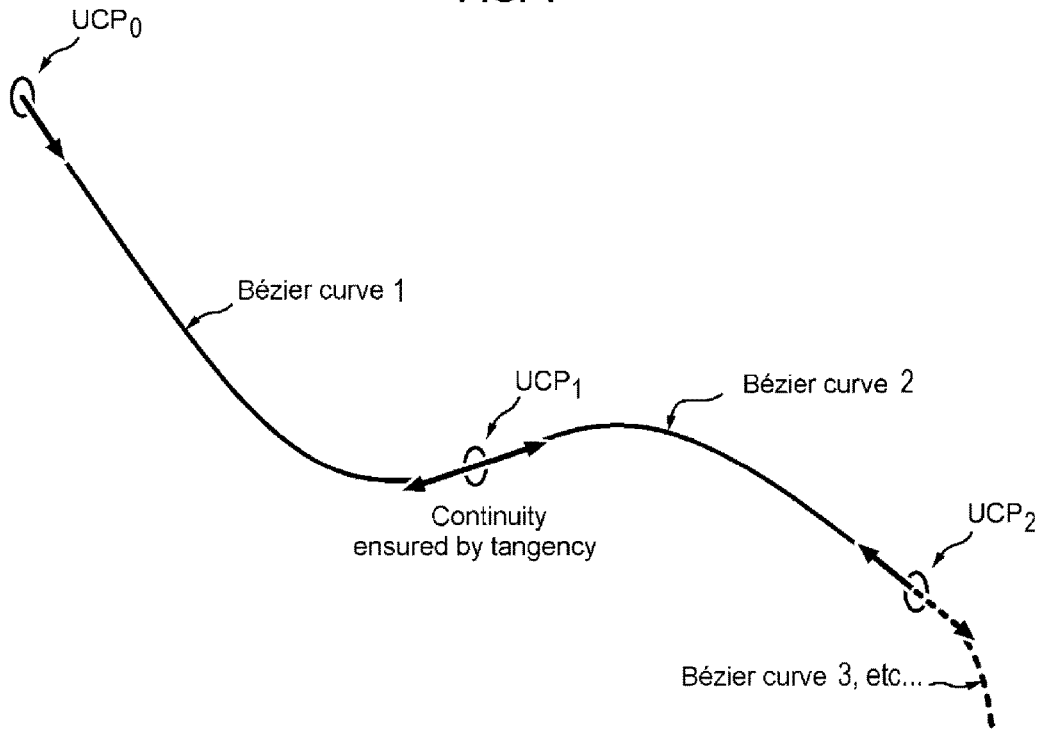
FIG. 4 illustrates a curve used by the method according to the invention.

As this is seen in FIG. 4 for example, the modeling curve may only consist of a sequence of Bézier curves, each extending between an end point $UCP_0$, $UCP_K$ and an intermediate point $UCP_i$, or between two intermediate points $UCP_i$ and $UCP_{i+1}$.

In other words, all the (end or intermediate) user control points $UCP_0$, $UCP_1$ ... $UCP_{K-1}$, $UCP_K$ of the curve are end control points $P_0$, $P_N$ of a Bézier curve.

The fact that the curve is of class $C^1$ imposes that each intermediate point $UCP_i$ ensures continuity including on the derivative (same tangent).

As this will be seen in the examples, the use of a single intermediate point $UCP_1$ (and therefore of two Bézier curves) is sufficient for defining very satisfactorily the curve representing a law. However, it will be understood that the method may be generalized to the use of K−1 (with K≥2) intermediate points ($UCP_i$, $i \in [[1, K-1]]$) ordered according to the travel of said part portion 1 (a blade 2 in the case of blading), i.e., K Bézier curves (one between each pair of control points $\{UCP_i; UCP_{i+1}\}$).

In every case, the modeling curve comprises at least two "end" Bézier curves, i.e., having as an extremity one of the two end user control points $UCP_0$ and $UCP_K$ the first Bézier curve is defined on the interval comprised between the end point $UCP_0$ associated with the beginning of said part portion 1 and the first intermediate point $UCP_1$, and the $K^{th}$ Bézier curve (the other end curve) is defined on the interval comprised between the K−1$^{th}$ intermediate point $UCP_{K-1}$ and the end point $UCP_K$ associated with the end of said part portion 1.

In the case of at least two intermediate points $UCP_i$, in other words when K≥3, the modeling curve comprises intermediate Bézier curves: the $i^{th}$ ($\forall i \in [[2, K-1]]$) Bézier curves are each defined on the interval comprised between the i−1$^{th}$ intermediate point $UCP_{i-1}$ and the $i^{th}$ intermediate point $UCP_i$.

Parameters of a User Control Point

The processing parameterizes the modeling curve not according to the parameters of the implicit control points of a Bézier curve, but according to parameters of intermediate control points (and optionally end control points) defining extremities of Bézier curves forming the modeling curve.

In particular, each Bézier curve may be entirely determined by the UCP points defining its extremities. In other words, the parameters of the UCP points (in terms of coordinates and of derivatives) are used as boundary conditions for computing with the data processing means 11 the coordinates of the implicit control points of the different Bézier curves, which are selected with a sufficient minimum degree in order to meet these boundary conditions. Step (a) then comprises the definition of the implicit points of the Bézier curves according to the parameters of the UCP points forming their ends.

The parameter(s) defining an intermediate point $UCP_i$ is(are) thus selected from among an abscissa of the point, an ordinate of the point, an orientation of the tangent to the curve at the point and two tension coefficients each associated with a half-tangent to the curve at the point.

Being aware that the curve is of class $C^1$ (continuous derivative), the orientation of the tangent should be the same on either side of an intermediate point $UCP_i$. On the other hand, the "length" of both half-tangents may be different on either side of the point, a length which expresses the propensity of each Bézier curve of "adhering" to the tangent on either side of the point. This is what are the "tension coefficients" mentioned earlier model.

Practically, each tension coefficient associated with a half-tangent to the curve at an intermediate point depends on a value of a second derivative of the curve in the vicinity of the point. Indeed, the value of the second derivative in the vicinity of the control point expresses the "rate" with which the curve moves away from the tangent.

And the fact that the modeling curve is not necessarily a class $C^2$ allows discontinuities of a second derivative at the intermediate points.

In the case of a parameterized end point $UCP_0$ or $UCP_K$, the parameter(s) defining this end point is(are) selected from an abscissa of the point, an ordinate of the point, an orientation of the tangent to the curve at the point and a tension coefficient associated with a half-tangent to the curve at the point.

In other words, only the half-tangent in the definition domain of the curve (the one on the right for $UCP_0$ and the one on the left for $UCP_K$) may be taken into account.

It should be noted that all the parameters mentioned earlier are not necessarily actually used (in particular for the end points). Indeed, in the majority of the cases, one or several of these parameters (an abscissa of the point, an ordinate of the point, an orientation of the tangent to the curve at the point and two tension coefficients each associated with a half-tangent to the curve at the point) have a predetermined value set by the user, and are therefore not used as "variables" for the continuation of the method.

Examples

FIGS. 5a-5e illustrate different curves which may be used for modeling the law of a quantity called "skeleton angle law (β)", which corresponds to the derivative of the skeleton of the section of the blade 2 (see FIG. 1d).

Figure 5A:
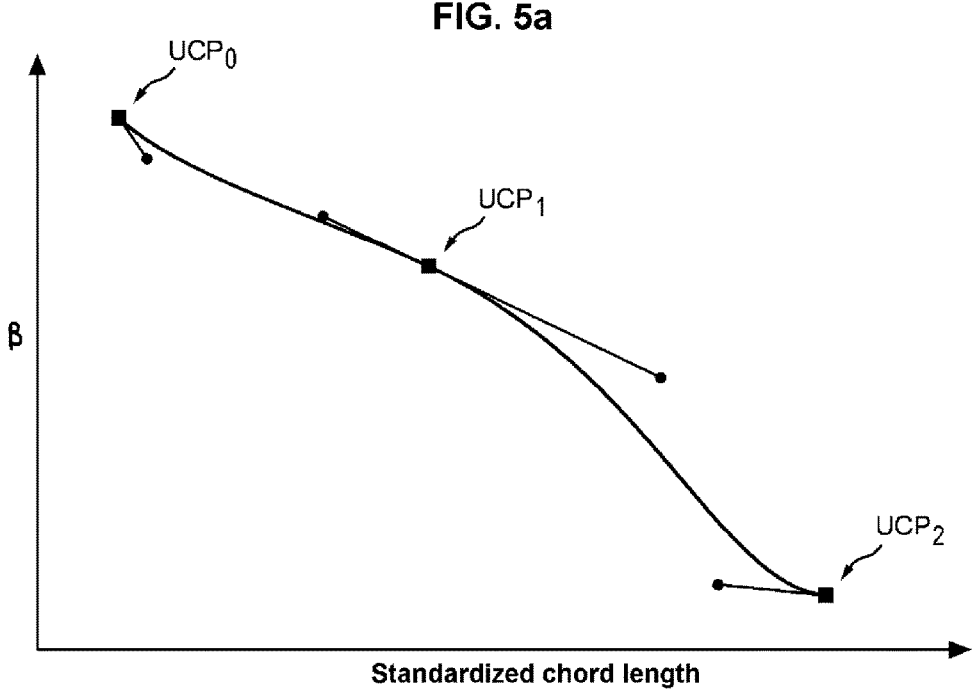
FIGS. 5a-5e are examples illustrating the application of the invention for a thickness law on a blade of blading.

In FIG. 5a, the law is modeled by using a single intermediate point $UCP_1$, with a greater tension on the right as compared with on the left.

Figure 5B:
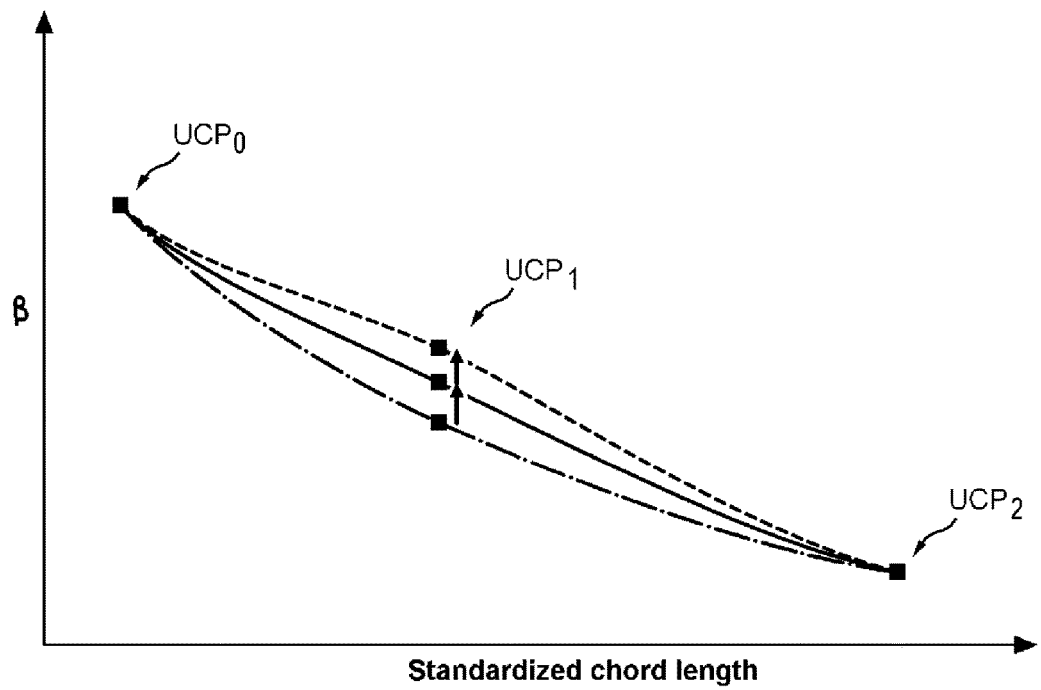

In FIG. 5b, the parameter taken into account is the coordinate y of the intermediate point UCP$_1$. Three instances of the curve corresponding to three different values of this parameter are illustrated.

Figure 5C:
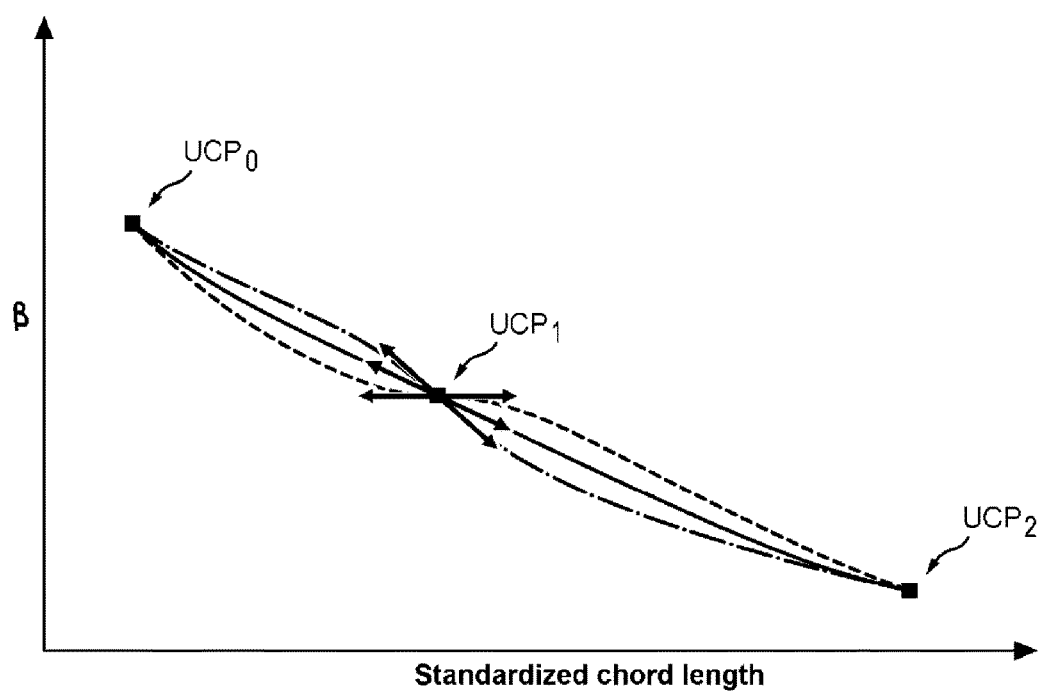

In FIG. 5c, the parameter taken into account is the orientation of the tangent to the curve at the intermediate point UCP$_1$ (in other words, the value of the derivative at this point). Three instances of the curve corresponding to the three different values of this parameter are illustrated.

Figure 5D:
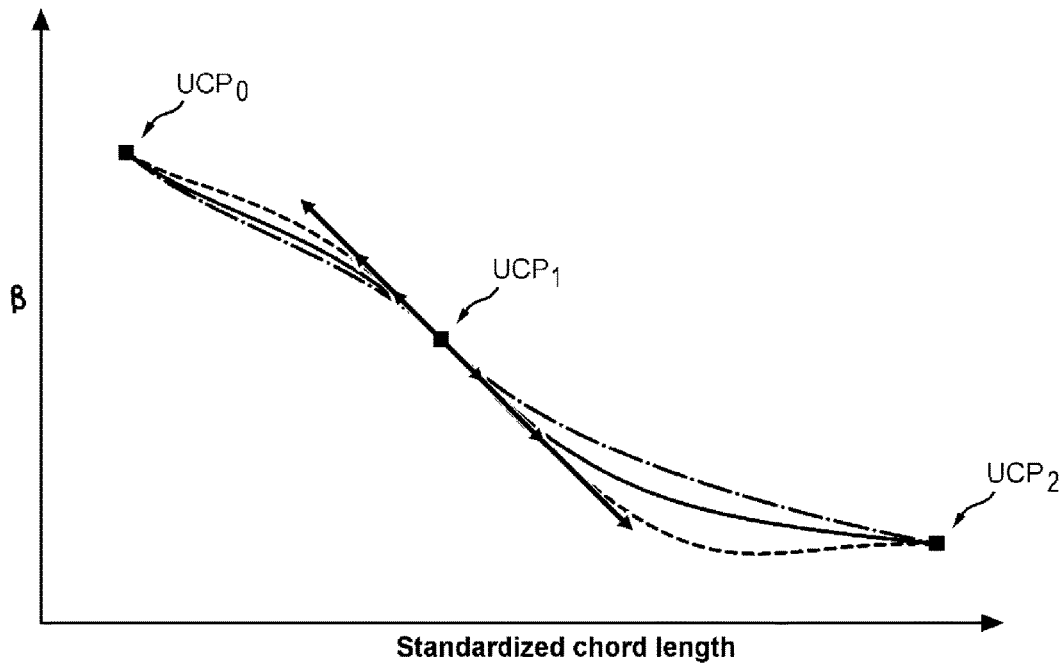

In FIG. 5d, two parameters are taken into account, i.e., the tension coefficients each associated with a half-tangent to the curve at the intermediate point UCP$_1$. Three instances of the curve corresponding to three pairs of values for these parameters are illustrated.

Figure 5E:
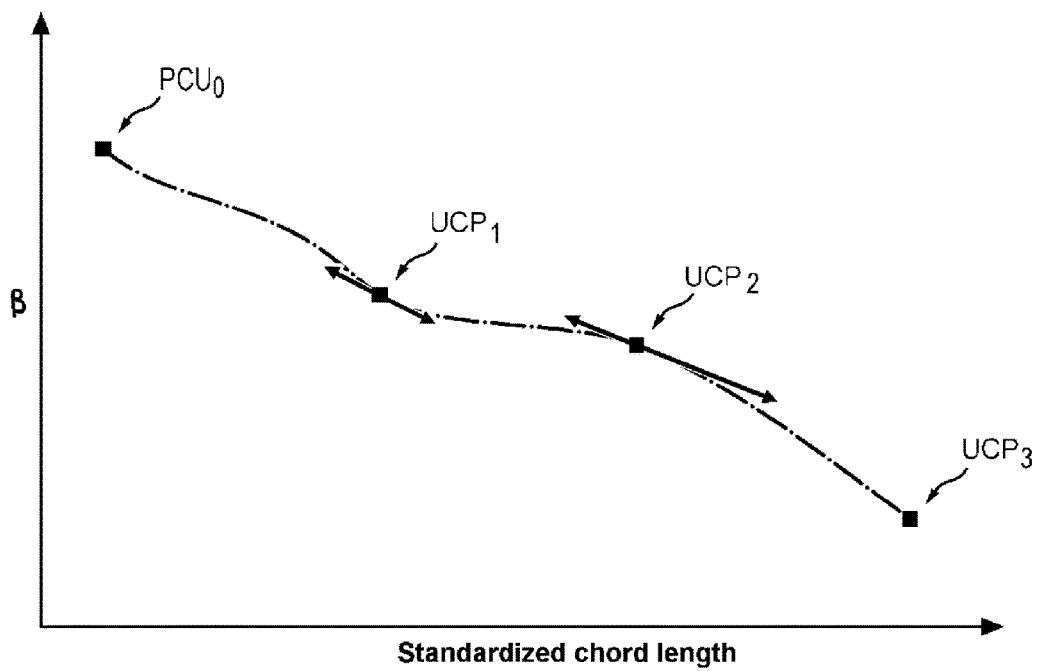

FIG. 5e represents an alternative in which two intermediate points UCP$_1$ and UCP$_2$ are used.

FIGS. 6a-6e illustrate various curves which may be used for modeling the law of another quantity called a "thickness law", which simply corresponds to the thickness of the blade 2 along the section.

Figure 6A:
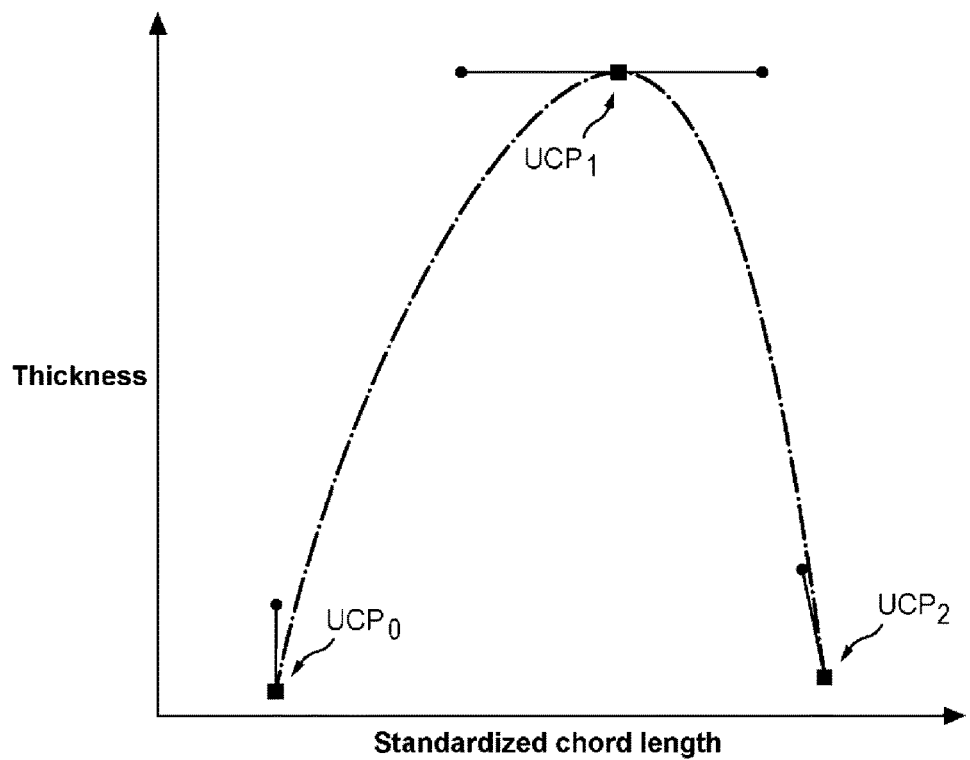
FIGS. 6a-6e are examples illustrating the application of the invention for a skeleton angle law on a blade of blading.

In FIG. 6a, the law is modeled by using a single intermediate point UCP$_1$, with a horizontal tangent (local maximum).

Figure 6B:
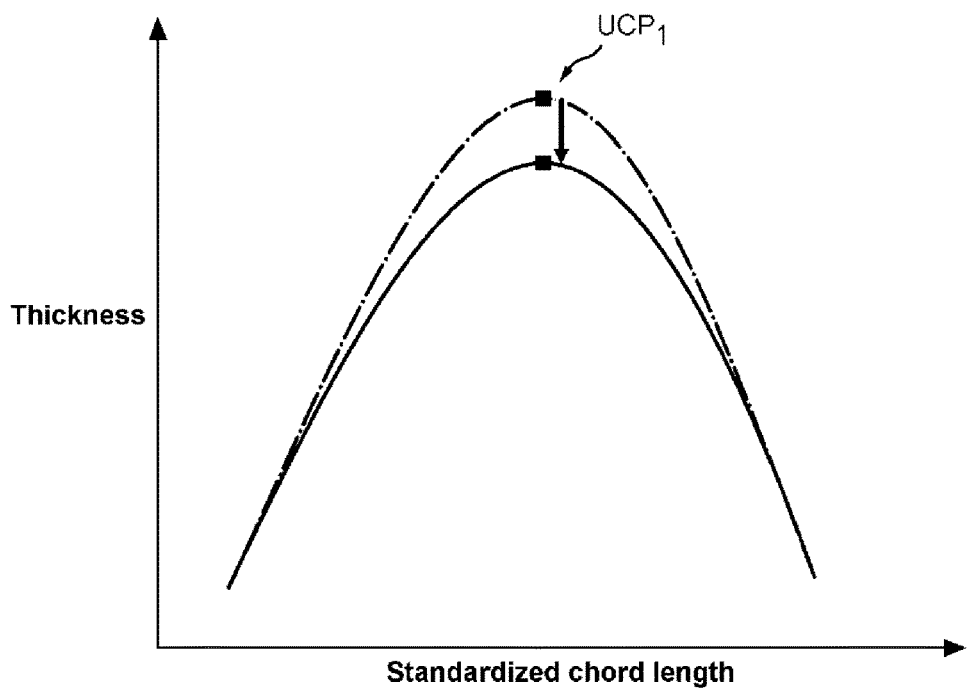

In FIG. 6b, the parameter taken into account is the coordinate y of the intermediate point UCP$_1$. Three instances of the curve corresponding to the three different values of this parameter are illustrated.

Figure 6C:
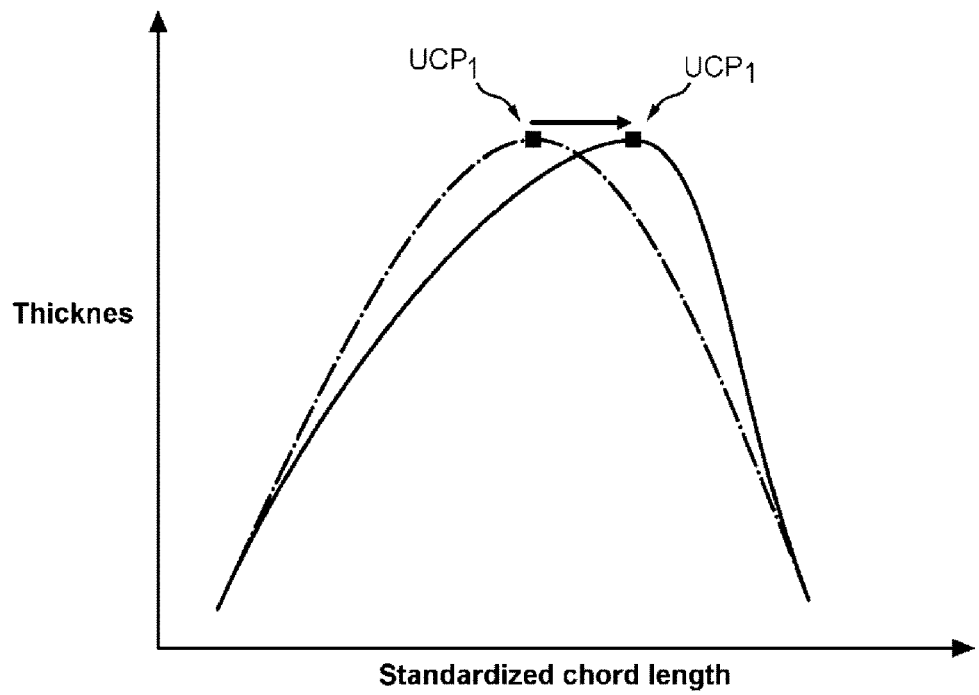
Figure 6D:
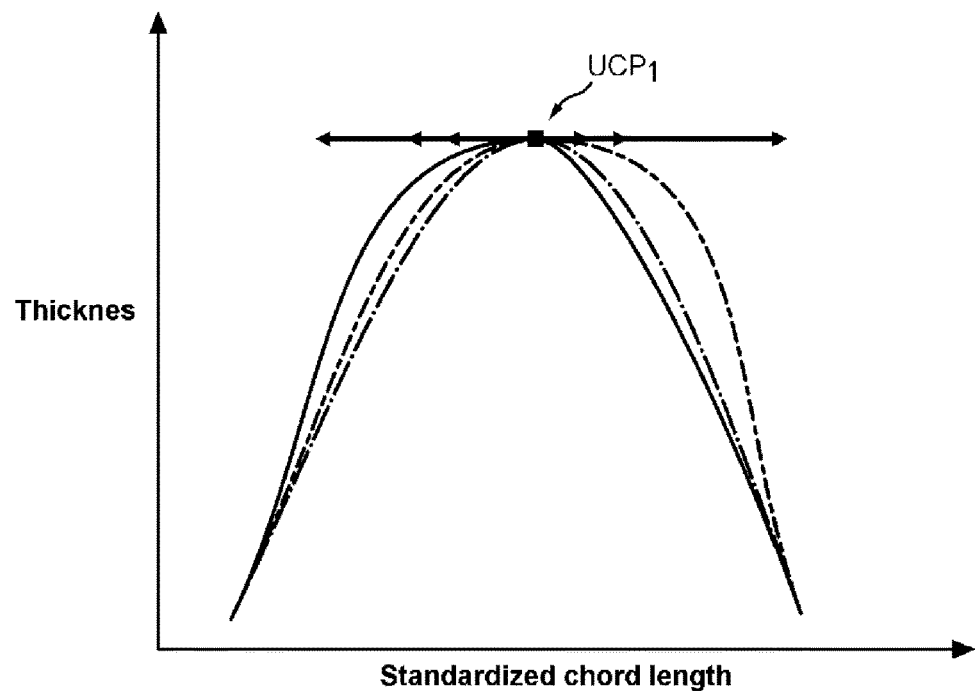

In FIG. 6c, the parameter taken into account is the coordinate x of the intermediate point UCP$_1$. Three instances of the curve corresponding to the three different values of this parameter are illustrated. The adaptation of both Bézier curves on either side of the intermediate point UCP$_1$ is noted so as to observe the conditions imposed by the parameters of this point.

In FIG. 6d, again both tension coefficients each associated with a half-tangent to the curve at the intermediate point UCP$_1$ are taken into account. Three instances of the curve corresponding to the three pairs of values for these parameters are illustrated. A curve is notably noted, for which the coefficients are particularly unbalanced, whence a particularly visible asymmetry of the curve.

Figure 6E:
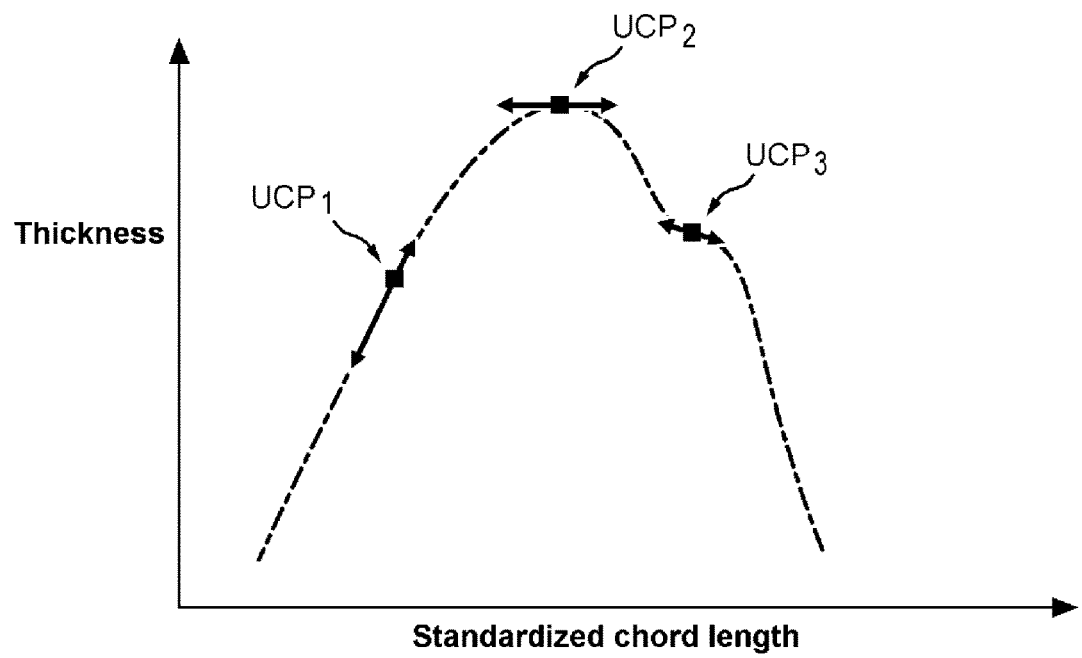

FIG. 6e illustrates a highly advanced alternative in which three intermediate points UCP$_1$, UCP$_2$ and UCP$_3$ are used.

Optimization and Output

According to a second step (b), the method comprises a step for determining with the data processing means 11 optimized values (and if possible optimum values) of said parameters of said curve. This is an optimization step.

Many techniques for applying this step are known to one skilled in the art, and for example it is simply possible to vary pseudo-randomly the variable selected parameters while carrying out simulations for determining these optimized values (i.e., for which the selected criterion is maximized) of the parameters of the control points UCP$_i$. The invention is however not limited to this possibility.

In a last step (c), the determined values of the parameters are output by the interface means 13 of the piece of equipment 10 for use, for example by displaying the modeling curve in which the parameters are set to these optimized values.

Alternatively, the interface means 13 may only display these numerical values.

Manufacturing Method and Part

Once it is modeled, the part 1 may be manufactured. A method for manufacturing a part 1 (in particular a blading) is thus proposed, the method comprising the steps:

Applying the method according to the first aspect so as to model at least one portion of the part 1 (a portion of a blade 2 of the blading);

Manufacturing said part 1 according to the modeling of said at least one portion of the obtained part 1.

A blading 1 comprising a plurality of blades 2, thereby produced, may be obtained. It has the desired optimum physical properties.

Equipment

The piece of equipment 10 (illustrated in FIG. 4) for applying the method for modeling a part 1 comprises data processing means 11 configured so as to implant:

a module for parameterizing a curve of class $C^1$ representing the value of a physical quantity characterizing said part 1 as a function of a position along at least one portion of the part 1, the module defining a curve by:

Two end points UCP$_0$, UCP$_K$ defining the extent of said portion of the part 1;

At least an intermediate point UCP$_i$, $i \in [[1, K-1]]$ positioned between the two end points UCP$_0$, UCP$_K$;

At least two Bézier curves connected at said intermediate point;

the parameterization being applied according to one or several parameters defining said intermediate point;

a module for determining optimized values of said parameters of said curve;

a module for outputting the determined values on an interface 13 of said piece of equipment 10.

Computer Program Product

According to a fourth and a fifth aspect, the invention relates to a computer program product comprising code instructions for executing (on data processing means 11, in particular those of the piece of equipment 10) a method according to the first aspect of the invention for modeling a part 1, as well as storage means legible by a piece of computer equipment (for example a memory 12 of this piece of equipment 10) on which is found this computer program product.

The invention claimed is:

1. A method for manufacturing a part wherein the part is modeled, by a data processor executing programmed instructions for:
   (a) parameterizing a curve of class $C^1$ representing the value of a physical quantity characterizing said part as a function of a position along at least one portion of the part, the curve being defined by:
      a. two end points defining the extent of said portion of the piece;
      b. at least one intermediate point positioned between the end points;
      c. at least two Béziers curves connected at said intermediate point;
      the parameterization being applied according to one or several parameters defining said intermediate point;
   (b) determining optimized values of said parameters of said curve;
   (c) outputting determined values on an interface of said data processor;
   after said outputting, manufacturing said part according to the modeling of the at least one portion of the part.

2. The method according to claim 1, wherein said parameter(s) defining an intermediate point is(are) selected from an abscissa of the point, an ordinate of the point, an orientation of the tangent to the curve at the point and two tension coefficients each associated with a half-tangent to the curve at the point.

3. The method according to claim 1, wherein the parameterization is also applied according to one or several parameters defining at least one of the end points.

4. The method according to claim 3, wherein the parameter(s) defining an end point is(are) selected from an abscissa of the point, an ordinate of the point, an orientation of the tangent to the curve at the point and one tension coefficient associated with a half-tangent to the curve at the point.

5. The method according to claim 2, wherein a tension coefficient associated with a half-tangent to the curve at an intermediate or end point depends on a second derivative value of the curve in the vicinity of the point.

6. The method according to claim 1, wherein said curve is defined by K−1 intermediate points ($UCP_i$, i∈[[1, K−1]]) ordered along the travel of said portion of the part, and K Bézier curves, with K≥2.

7. The method according to claim 6, wherein the first Bézier curve is defined on the interval comprised between the end point ($UCP_0$) associated with the beginning of said portion of the part and the first intermediate point ($UCP_1$), the $K^{th}$ Bézier curve is defined on the interval comprised between the K−1$^{th}$ intermediate point ($UCP_{K-1}$) and the end point ($UCP_K$) associated with the end of said portion of the part.

8. The method according to claim 7, wherein K≥3, the $i^{th}$ Bézier curve(s) (i∈[[2,K−1]]) each being defined on the interval comprised between the i−1$^{th}$ intermediate point ($UCP_{i-1}$) and the $i^{th}$ intermediate point ($UCP_i$).

9. The method according to claim 1, wherein each Bézier curve is entirely determined by the points defining its extremities.

10. The method according to claim 1, wherein the part is selected from a blading, a turbine engine platform, a rear-view mirror, a fin, a fixed or rotary wing, a tail section, a fuselage, a propeller, a nozzle, a vein, a fairing and a turbine.

11. The method according to claim 10, wherein the part is a blading, the part portion being a portion of a blade of the blading.

12. The method according to claim 11, wherein said blade portion of blading is a sectional portion of the blade of the blading or a height portion of the blade of the blading.

13. The method according to claim 12, wherein said characteristic physical quantity of said blading is selected from among the thickness of the blading, the skeleton, the skeleton angle law of a section of the blade of the blading, the maximum thickness law, the position law of the maximum thickness, the sag and dihedral angles, the stacking law, the upstream/downstream angles of the blade of the blading along the height.

* * * * *